Dec. 1, 1936. H. O. ROOSENSTEIN Re. 20,189

OSCILLATION CIRCUIT FOR ELECTRIC WAVES

Original Filed July 7, 1930

INVENTOR
HANS OTTO ROOSENSTEIN
BY Harry Tunick
ATTORNEY

Reissued Dec. 1, 1936 Re. 20,189

UNITED STATES PATENT OFFICE 20,189

OSCILLATION CIRCUIT FOR ELECTRIC WAVES

Hans Otto Roosenstein, Berlin, Germany, assignor to Telefunken Gesellschaft für Drahtlose Telegraphie m. b. H., Berlin, Germany, a corporation of Germany Original No. 1,955,093, dated April 17, 1934, Serial No. 465,947, July 7, 1930. Application for reissue June 23, 1934, Serial No. 732,161. In Germany July 6, 1929

25 Claims. (Cl. 250—36)

For various technical purposes, for instance, wave-meters and for maintaining the frequency of transmitters at a constant value, oscillatory systems possessing very low damping are required. What is used therefor are electrical circuits involving feeble damping, quartz crystals, etc.

When recourse is had to circuits with low damping the radiation resistance or characteristic impedance plays a part in the case of short waves. In order to prevent such radiation of the circuit it is general practice to accommodate the circuit within a shielded box. By virtue of induction from the oscillation circuit there are then set up in the said box currents of such size, sense and phase that the electromagnetic field outside the box is almost entirely suppressed or neutralized. However, these induction currents involve losses whereby the advantage obtained is diminished.

According to this invention no currents specially produced therefor are utilized for the shielding indeed, the current flowing in the circuit itself is conducted along the shielding box in such a manner that the electromagnetic field outside the box becomes practically zero.

Figure 2:
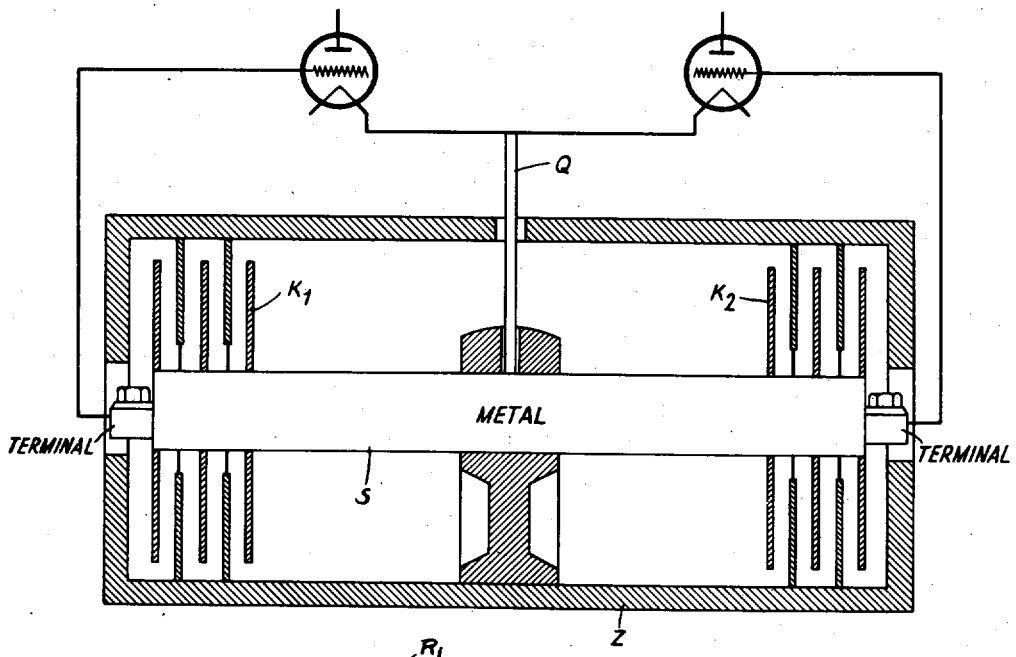
Figure 1:
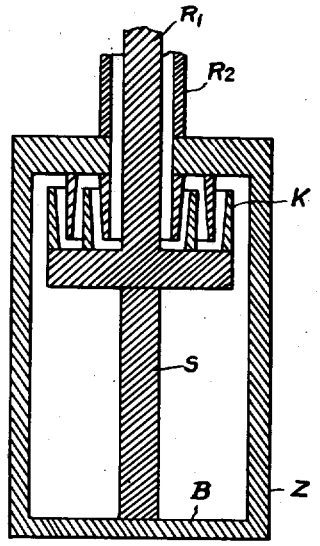

Figures 1 and 2 show two different embodiments of the present invention.

Fig. 1 shows an embodiment which is readily practicable in technical respect. The arrangement comprises a hollow cylinder Z consisting of metal upon the bottom surface B of which the inductance S in the form of a metallic rod is conductively fastened. A capacity K which is here shown to consist of a concentric ring condenser, completes the oscillation circuit. Terminals R1 and R2 serve for connecting the circuit to the apparatus wherein the circuit is to be used.

Owing to the concentric arrangement here resorted to, all parts are uniformly passed by the current, so that the losses are minimized.

The circuit shown in Fig. 1 is little suited for push-pull schemes for the reason that the ground capacities of the two condenser coats are of unequal size.

A modification of the arrangement which is free from this drawback is illustrated in Fig. 2. In this scheme the inductance in the form of rod S at both ends is provided with capacities K1 and K2, and it is supported at a point which often is located at the middle of the rod. At this point the rod can be mounted in a way either associated with the cylinder Z or insulated therefrom. In this latter case it is a suitable scheme in many arrangements to provide a conductive connection PQ at this point P with some other convenient circuit elements located outside the cylinder Z. What is particularly referred to here is the case where the circuit constitutes the grid circuit in a push-pull transmitter, and where the connection PQ serves for allowing the grid current to leak away.

It goes without saying that all such ways and means as are known in the prior art for cooling may be used in the circuit.

I claim:

1. An oscillatory circuit for high frequency currents comprising a hollow metallic cylinder, said cylinder being closed on all sides except for an aperture in the approximate center of one end wall of said cylinder, a condenser within said cylinder comprising a plurality of separated metallic plates, alternate ones of which are connected to the two opposite end walls of said cylinder whereby the condenser is short circuited for direct current, and an inductance in the form of a metallic rod connecting one group of said plates to one of said opposite end walls, said rod being arranged to extend through said aperture in the other opposite end wall whereby the combination of said inductance, condenser and cylinder form an oscillatory circuit for high frequency currents.

2. An oscillatory circuit for high frequency currents comprising a hollow metallic enclosed cylinder, a condenser within said cylinder comprising a plurality of separated metallic plates, alternate ones of which are connected together, one of said groups of metallic plates being connected to a wall of said cylinder, and the other group of said plates being coupled to said wall through an inductance in the form of a metallic rod whereby the combination of said inductance, condenser and cylinder form an oscillatory circuit for high frequency currents.

3. An oscillatory circuit for high frequency currents comprising a hollow metallic enclosed cylinder, an inductance in the form of a metallic rod extending axially through the center of said cylinder, a condenser comprising a plurality of separated circular shaped plates at one end of said rod, alternate ones of which are connected together, one of said groups of circular plates being connected to the wall of said cylinder and the other group of said circular plates being connected to said metallic rod, another condenser at the other end of said rod having plates similarly connected to said rod and said cylinder, whereby the combination of said inductance, condensers and cylinder form an oscillatory circuit for high frequency currents.

4. An oscillatory circuit for high frequency currents comprising a hollow metallic cylinder, said cylinder having end walls, a condenser within said cylinder comprising a plurality of separated metallic plates, alternate ones of which are coupled to said opposite end walls of said cylinder, an inductance in the form of a metallic rod acting to directly connect one group of said circular plates to one of said walls, whereby the combination of said inductance, condenser and cylinder form an oscillatory circuit for high frequency currents.

5. A high frequency circuit comprising a straight hollow metallic cylinder, a straight cylindrical metallic member arranged concentrically within said cylinder, a condenser plate element fastened to said inner metallic member at one end thereof, and a condenser plate element electrically connected to said outer member and capacitively cooperating with said first mentioned condenser plate element for tuning said metallic cylinder and cylindrical member to a desired operating frequency, means for coupling the other end of said inner metallic member to said cylinder, said circuit being so constructed and arranged that high frequency currents in said circuit flow over the outer surface of said inner cylindrical member and over the inner surface of said outer hollow metallic cylinder.

6. A tuned high frequency circuit comprising a straight, solid, cylindrical metallic member, a cylinder of metal about said member, said cylinder and member being arranged coaxially and parallel to each other, and a lumped capacity connected between the ends of said member and the adjacent ends of said cylinder.

7. A tuned high frequency circuit comprising a straight, solid, cylindrical metallic member, a cylinder of metal about said member, said cylinder and member being arranged coaxially, concentrically, and parallel to each other, a capacity element connected to one end of said member, and a capacity element cooperating with said first mentioned capacity element connected to an adjacent end of said cylinder, said other ends of said member and cylinder being coupled together.

8. A resonant high frequency circuit comprising a pair of concentric conductors, means for coupling said conductors together at one of their adjacent ends, and a lumped capacity for coupling the conductors together at their other adjacent ends.

9. A high frequency oscillatory circuit comprising a pair of concentric coaxial conductors directly connected together at one of their adjacent ends, said conductors being circular in cross section, and a lumped capacity for coupling said conductors at their other adjacent ends.

10. A tuned high frequency circuit comprising a pair of concentric conductors capacitively coupled together more closely at their adjacent ends than at their intermediate portions.

11. An oscillatory circuit for high frequency currents comprising a hollow metallic cylinder, an inductance in the form of a straight inner coaxial conductor, means for capacitively coupling one end of said inner conductor to said cylinder and conductively coupling the other end of said inner conductor to said cylinder.

12. A tuned high frequency oscillatory circuit of capacitance and substantially uniformly distributed inductance, said inductance being substantially straight and comprising a pair of conductors concentrically arranged with respect to each other over the greater portion of their lengths and coupled to each other at a point along their lengths, said capacitance comprising a condenser having a plate connected to said inner conductor and coupled to said outer conductor at a different point.

13. A tuned high frequency circuit comprising a straight metallic member, a metallic surface of revolution about said member, said surface and member being arranged coaxially to each other and being connected together at a point, a capacitance coupling together said member and said surface of revolution at another point, said capacitance comprising a plurality of plates connected to said surface of revolution and interleaving plates connected to said member.

14. An oscillatory circuit for high frequency currents comprising a hollow metallic cylinder, a substantially straight inductance within said cylinder and coaxially arranged with respect thereto, said inductance extending substantially the length of said cylinder, a lumped capacity for coupling one end of said inductance with the adjacent end of said hollow metallic cylinder, and means for directly connecting the other end of said inductance with its adjacent end of said cylinder.

15. A tuned high frequency circuit comprising a pair of concentric metallic conductors coupled together at one of their adjacent ends, the inner conductor having a portion of larger diameter at the other end to increase the capacitance existing between said conductors.

16. A tuned high frequency circuit comprising a substantially straight, metallic member, a cylinder of metal about said member, said cylinder and member being arranged coaxially and parallel to each other, and a lumped capacity connected between said member and cylinder at each of their ends.

17. A tuned high frequency circuit comprising a straight metallic member, a cylinder of metal about said member, said cylinder and member being arranged coaxially, concentrically, and parallel to each other, a capacity element connected to one end of said member, and a capacity element cooperating with said first mentioned capacity element connected to an adjacent end of said cylinder, said other ends of said member and cylinder being coupled together.

18. A tuned high frequency circuit comprising a pair of concentric metallic conductors conductively coupled together at one of their adjacent ends, the inner conductor having a portion of larger diameter at the other end to increase the capacitance existing between said conductors.

19. A tuned high frequency circuit comprising a pair of concentric conductors, and means for capacitively coupling said conductors together at both their adjacent ends.

20. A tuned high frequency circuit comprising a substantially straight metallic rod devoid of concentrated reactance, and an outer hollow shell surrounding said rod, means for conductively connecting one end of said rod to said shell, and means for capacitively coupling the other end of said rod to said shell.

21. A tuned high frequency circuit comprising a substantially straight metallic rod devoid of concentrated reactance, and an outer hollow shell surrounding said rod, and means for coupling both ends of said rod to different points on said shell, said tuned high frequency circuit including a capacitance serially arranged with respect to said rod and shell.

22. In combination, an oscillatory circuit comprising an inner and an outer concentric conductor, means at each end of said inner conductor coupling said inner conductor to said outer conductor, a connection intermediate the ends of said inner conductor and substantially at the center thereof for conductively coupling said inner conductor to said outer conductor, at least one of said means comprising a capacitance.

23. In combination, an oscillatory circuit comprising an inner and an outer concentric conductor, means at each end of said inner conductor coupling said inner conductor to said outer conductor, at least one of said means comprising a capacitance, a connection intermediate the ends of said inner conductor and substantially at the center thereof for conductively coupling said inner conductor to said outer conductor, a pair of electron discharge devices coupled in push-pull relation, a connection from the cathodes of said devices to said inner conductor at the center thereof, and connections from the opposite ends of said inner conductors to the grids of said devices.

24. A tuned high frequency oscillatory circuit of capacitance and substantially uniformly distributed inductance, said inductance being substantially straight and comprising a pair of conductors concentrically arranged with respect to each other over the greater portion of their lengths and coupled to each other at a point along their lengths, said capacitance comprising a condenser arranged to serially couple said pair of conductors together.

25. A tuned high frequency oscillatory circuit comprising a pair of conductors concentrically arranged for at least a portion of their lengths, said conductors being conductively connected together at one of their ends, and means for capacitively coupling said conductors together at a point removed from said one end.

HANS OTTO ROOSENSTEIN.